(12) United States Patent
Dubinsky et al.

(10) Patent No.: US 10,986,138 B2
(45) Date of Patent: Apr. 20, 2021

(54) SYSTEM AND METHOD FOR ADAPTIVELY DETERMINING AN OPTIMAL AUTHENTICATION SCHEME

(71) Applicant: Source Ltd., Valletta (MT)

(72) Inventors: Ilya Dubinsky, Kefar Sava (IL); Dana Levy, Tel Aviv (IL)

(73) Assignee: SOURCE LTD., Valletta (MT)

( * ) Notice: Subject to any disclaimer, the term of this patent is extended or adjusted under 35 U.S.C. 154(b) by 143 days.

(21) Appl. No.: 16/194,433

(22) Filed: Nov. 19, 2018

(65) Prior Publication Data

US 2020/0162515 A1    May 21, 2020

(51) Int. Cl.
| | |
|---|---|
| *H04L 29/06* | (2006.01) |
| *G06N 20/00* | (2019.01) |
| *G06F 21/45* | (2013.01) |
| *G06K 9/62* | (2006.01) |
| *G06F 17/16* | (2006.01) |
| *H04L 29/08* | (2006.01) |

(52) U.S. Cl.
CPC ............ *H04L 63/205* (2013.01); *G06F 17/16* (2013.01); *G06F 21/45* (2013.01); *G06K 9/6218* (2013.01); *G06N 20/00* (2019.01); *H04L 63/08* (2013.01); *H04L 63/308* (2013.01); *H04L 67/306* (2013.01)

(58) Field of Classification Search
CPC ..... H04L 63/205; H04L 63/08; H04L 63/308; H04L 67/306; G06N 20/00; G06F 17/16; G06F 21/45; G06K 9/6218
See application file for complete search history.

(56) References Cited

U.S. PATENT DOCUMENTS

| | | | | |
|---|---|---|---|---|
| 9,497,312 | B1* | 11/2016 | Johansson | H04L 63/083 |
| 9,667,611 | B1* | 5/2017 | Friedman | G06F 21/32 |
| 9,699,196 | B1* | 7/2017 | Kolman | H04L 63/104 |
| 10,158,650 | B1* | 12/2018 | Hadiaris | G06F 21/64 |
| 2003/0115142 | A1* | 6/2003 | Brickell | G07C 9/22 705/51 |
| 2014/0130127 | A1 | 5/2014 | Toole et al. | |
| 2015/0381598 | A1* | 12/2015 | Koved | H04L 63/08 726/3 |
| 2016/0359838 | A1 | 12/2016 | Dasgupta et al. | |
| 2018/0288161 | A1* | 10/2018 | Saxena | H04L 67/125 |
| 2019/0362355 | A1* | 11/2019 | Zhang | G06Q 20/401 |
| 2020/0042679 | A1* | 2/2020 | Fuentes | G06F 21/335 |

OTHER PUBLICATIONS

International Search Report for application No. PCT/IL2019/051185, dated Jan. 20, 2020.

* cited by examiner

*Primary Examiner* — Malcom Cribbs
*Assistant Examiner* — Stephanie S Ham
(74) *Attorney, Agent, or Firm* — Pearl Cohen Zedek Latzer Baratz LLP (57) ABSTRACT

A method and a system for determining an optimal authentication scheme for an authenticating system. Embodiments may include: receiving, from the authenticating system an identity of a user requiring access to the authenticating system and a policy of the authenticating system; receiving, from a storage device, data including historical information regarding previous authentication attempts by the user; producing a list including an optimal selection of one or more authentication schemes, each including one or more authentication factors, according to the historical information and the authenticating system policy; and sending the selection list of one or more authentication schemes to the authenticating system.

26 Claims, 3 Drawing Sheets

SYSTEM AND METHOD FOR ADAPTIVELY DETERMINING AN OPTIMAL AUTHENTICATION SCHEME

FIELD OF THE INVENTION

The present invention generally relates to user authentication systems. More specifically, the present invention relates to a method and a system for adaptively determining an optimal authentication scheme.

BACKGROUND OF THE INVENTION

Commercially available methods and systems for authentication are normally adapted to receive an identification of a user and authenticate or verify the user's proclaimed identity to grant the user access to respective computational resources and/or data. For example, a user may identify himself or herself by a name or an identification number (ID) to an online server (e.g., an online banking server), and the server may require the user to perform various tests or procedures (e.g., type in a password) in order to access the requested data.

Common authentication systems typically require the user to perform one or more authentication procedures in a manner that may be indifferent to or dissociated from a variety of properties, including properties of the user and the authenticating system, and from the history of previous authentication attempts.

SUMMARY OF THE INVENTION

A system and a method that may select or recommend an authentication scheme that may include one or more authentication factors to process the user's access request, according to properties of the user (e.g., a user profile and user preference), properties of the authenticating system (e.g., a minimal authentication level) and according to the history of previous authentication attempts (e.g. the probability of successful, first time authentication) is therefore desired.

Embodiments of the present invention may be adapted to produce or select an authentication scheme that may satisfy a plurality of different, and possibly contradicting requirements, through a set of weighted scores. For example, an online banking server may require an inconveniently large number of authentication procedures to be executed before granting access to a user. In a complementary manner, the user may prefer not to go through any authentication procedure at all.

Embodiments may suggest or recommend one or more authentication schemes in a manner that is optimal, in a sense that the selected one or more authentication schemes may best satisfy the different, and possibly contradicting requirements. Pertaining to the above example, embodiments may apply (e.g., as part of a predefined policy) a first weight to the level of security and a second weight to the level of convenience. An optimally selected authentication scheme may be one that may provide a higher weighted score, thus mitigating between the two seemingly contradicting considerations of security and convenience.

Embodiments of the present invention may include a method of determining an optimal authentication scheme for an authenticating system. The method may include:
receiving, from the authenticating system an identity of a user requiring access to the authenticating system and a policy of the authenticating system;
receiving, from a storage device, data including historical information regarding previous authentication attempts by the user;
producing a list including an optimal selection of one or more authentication schemes, each including one or more authentication factors, according to the historical information and the authenticating system policy; and
sending the selection list of one or more authentication schemes to the authenticating system.

Embodiments of the method may include:
presenting the list of one or more authentication schemes by the authenticating system to the user;
prompting the user to select at least one authentication scheme; and
storing the user's selection as an explicit preference of authentication.

The authenticating system policy may include a required authentication level, at least one available authentication factor and an associated at least one a-priori score.

The authenticating system policy may further include at least one attribute weight, selected from a list including a success probability attribute weight, a convenience attribute weight, a risk attribute weight and a preference attribute weight.

According to some embodiments, the historical information may include a number of successful previous authentication attempts by the user per each authentication factor and a number of failed previous authentication attempts by the user per each authentication factor. Producing a list of optimally selected authentication schemes may include calculating, for each authentication factor, the user's probability of successful authentication according to the historical information.

According to some embodiments, the historical information regarding previous authentication attempts by the user may include at least one of:
duration of authentication processes;
verified cases of successful fraudulent access;
verified cases of failed unauthorized access attempts; and
explicit selection of an authentication factor by the user.

According to some embodiments the method may include:
receiving data relating to personal profile information of a plurality of users; and
grouping the plurality of users to clusters in a clustering model according to the received personal profile information, wherein each cluster is characterized by specific cluster parameter values.

According to some embodiments the method may include:
producing a plurality of authentication schemes S, wherein each authentication scheme ($S_i$) is a unique combination of available authentication factors;
producing a likelihood matrix Y, wherein each entry $Y_{i,j}$ represents a likelihood that a user of cluster j would prefer authentication scheme $S_i$ and that the user would succeed on a first authentication attempt; and
training a machine learning (ML) model to predict $Y_{i,j}$ given specific cluster j parameters.

The likelihood that a user of cluster j would prefer authentication scheme $S_i$ and that the user would succeed on a first authentication attempt may be calculated according to at least one of:
an explicit preference score;
a probability of success;
a convenience score; and
a risk score.

Embodiments of the method may include:
receiving personal profile information of a user;
attributing a membership in one cluster of the clustering model to the user according to their personal profile information;
predicting likelihood Matrix Y according to the membership cluster's parameter values and according to the training of the ML model;
determining an optimal entry $Y_{i,j}$ for the user;
selecting at least one optimal authentication scheme according to the determined optimal entry $Y_{i,j}$; and
producing a list including the optimal at least one selected authentication scheme.

Embodiments of the method may include obtaining at least one implicit preference of an authentication factor of at least one user, according to a membership of the user in a cluster.

Embodiments of the method may include updating the probability of a user's successful authentication per each authentication factor according to the user's cluster membership.

Embodiments of the method may include updating the list of one or more recommended authentication schemes according to at least one of: the updated probability of a user's successful authentication and the obtained at least one implicit preference.

Embodiments of the present invention may include a system for determining an optimal authentication scheme for an authenticating system. The system may include: a non-transitory memory device, wherein modules of instruction code are stored, and a processor associated with the memory device, and configured to execute the modules of instruction code. The processor may be configured, upon execution of the modules of instruction code, to perform at least one of:
receive, from the authenticating system an identity of a user requiring access to the authenticating system and a policy of the authenticating system;
receive, from a storage device, data including historical information regarding previous authentication attempts by the user;
produce a list including an optimal selection of one or more authentication schemes, each including one or more authentication factors, according to the historical information and the authenticating system policy; and
send the selection list of one or more authentication schemes to the authenticating system.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Embodiments of the system may be associated with an authenticating system (e.g., a bank, an online store and the like) that may require authentication from a user (e.g., a client computer or a user thereof) in order to access (e.g., via online connection) any computational resource (e.g., a memory module) or data stored therein.

Embodiments may be configured to adaptively determine one or more optimal (e.g. determined by the system to be likely the best, given the circumstances) or suggested authentication schemes that may be required from the user, or may be required for the user to pass, to access the authenticating system.

The selection or determination of one or more schemes may be referred to as adaptive, as an improvement over commercially available systems that implement authentication methods, in a sense that it may produce different outcomes, following a change in at least one of:

a property or characteristic of the user's profile (e.g., the user's location of residence, financial condition, history of previous authentication attempts, etc.);

a user's explicit preference (e.g., prior selection of authentication schemes or factors made by the user);

a user's implicit preference (e.g., preferences made by similar users);

an authenticating system's policy (e.g., a minimal required level of security, availability of authentication factors, an a-priori score of each available authentication factor, etc.);

a continuously updating score relating to a convenience of using each authentication factor;

a continuously updating score relating to a risk associated with using an authentication factor; and a continuously updating score relating to probability of first-time success in using a specific authentication factor.

The authentication scheme may be determined as optimal by satisfying one or more predefined authentication criterion or a combination thereof. For example, the at least one predefined authentication criterion may include:

at least one security requirement of the authenticating system;

a preference of the user; and probability of successful authentication by the user.

Embodiments may attribute a weight to each authentication criterion and select or determine one or more schemes of authentication in an optimal manner, so as to obtain a maximal cumulative weighted score according to the attributed weights.

For example, embodiments may:

obtain a score per each authentication criterion (e.g. a success probability, a risk score and a convenience score);

assign or attribute respective weights per each authentication criterion (e.g. a success probability weight, a risk weight and a convenience weight);

produce a cumulative weighted sum per each authentication scheme according to the aforementioned scores and weights; and select at least one optimal authentication scheme (e.g. in a sense of having the maximal cumulative weighted sum), as elaborated herein.

Figure 1:
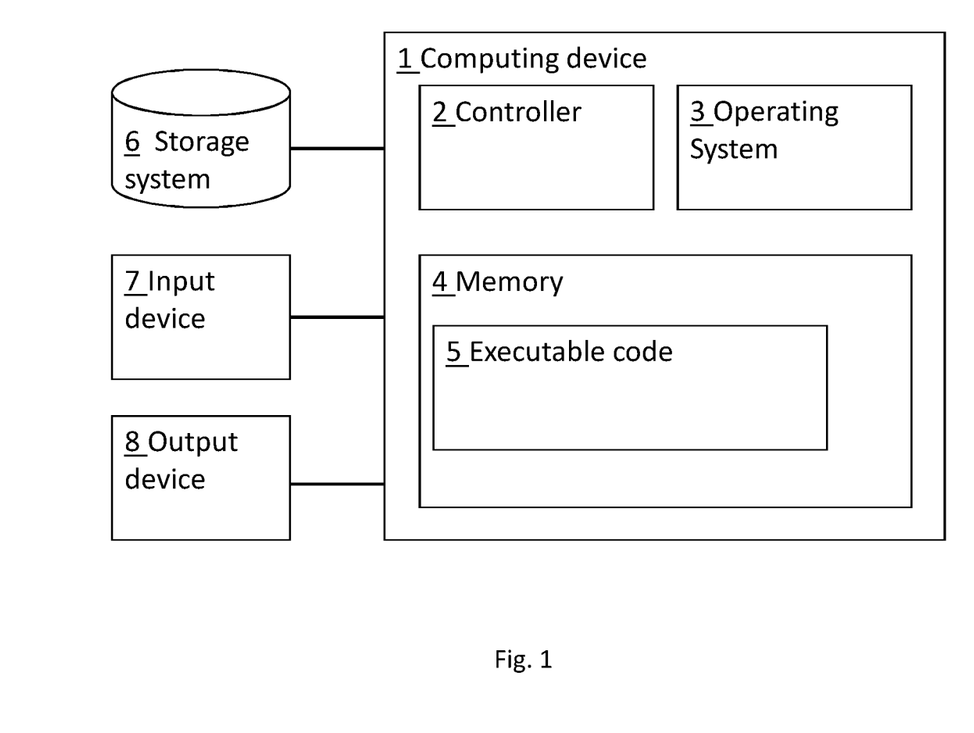
FIG. 1 is a block diagram, depicting a computing device, that may be included in a system for adaptively determining an optimal authentication scheme, according to some embodiments.

Reference is now made to FIG. 1, which is a block diagram depicting a computing device, which may be included within an embodiment of a system for adaptively determining a list or set (e.g. one or more) of optimal authentication schemes, according to some embodiments.

Computing device 1 may include a controller 2 that may be, for example, a central processing unit (CPU) processor, a chip or any suitable computing or computational device, an operating system 3, a memory 4, executable code 5, a storage system 6, input devices 7 and output devices 8. Controller 2 (or one or more controllers or processors, possibly across multiple units or devices) may be configured to carry out methods described herein, and/or to execute or act as the various modules, units, etc. More than one computing device 1 may be included in, and one or more computing devices 100 may act as the components of, a system according to embodiments of the invention.

Operating system 3 may be or may include any code segment (e.g., one similar to executable code 5 described herein) designed and/or configured to perform tasks involving coordination, scheduling, arbitration, supervising, controlling or otherwise managing operation of Computing device 1, for example, scheduling execution of software programs or tasks or enabling software programs or other modules or units to communicate. Operating system 3 may be a commercial operating system. It will be noted that an operating system 3 may be an optional component, e.g., in some embodiments, a system may include a computing device that does not require or include an operating system 3.

Memory 4 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 4 may be or may include a plurality of, possibly different memory units. Memory 4 may be a computer or processor non-transitory readable medium, or a computer non-transitory storage medium, e.g., a RAM.

Executable code 5 may be any executable code, e.g., an application, a program, a process, task or script. Executable code 5 may be executed by controller 2 possibly under control of operating system 3. For example, executable code 5 may be an application that may adaptively determine an optimal authentication scheme and/or authenticate a user as further described herein. Although, for the sake of clarity, a single item of executable code 5 is shown in FIG. 1, a system according to some embodiments of the invention may include a plurality of executable code segments similar to executable code 5 that may be loaded into memory 4 and cause controller 2 to carry out methods described herein.

Storage system 6 may be or may include, for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. Content may be stored in storage system 6 and may be loaded from storage system 6 into memory 120 where it may be processed by controller 2. In some embodiments, some of the components shown in FIG. 1 may be omitted. For example, memory 4 may be a non-volatile memory having the storage capacity of storage system 6. Accordingly, although shown as a separate component, storage system 6 may be embedded or included in memory 4.

Input devices 7 may be or may include any suitable input devices, components or systems, e.g., a detachable keyboard or keypad, a mouse and the like. Output devices 8 may include one or more (possibly detachable) displays or monitors, speakers and/or any other suitable output devices. Any applicable input/output (I/O) devices may be connected to Computing device 1 as shown by blocks 7 and 8. For example, a wired or wireless network interface card (NIC), a universal serial bus (USB) device or external hard drive may be included in input devices 7 and/or output devices 8. It will be recognized that any suitable number of input devices 7 and output device 8 may be operatively connected to Computing device 1 as shown by blocks 7 and 8.

A system according to some embodiments of the invention may include components such as, but not limited to, a plurality of central processing units (CPU) or any other suitable multi-purpose or specific processors or controllers (e.g., controllers similar to controller 2), a plurality of input units, a plurality of output units, a plurality of memory units, and a plurality of storage units.

The following Table may be used as a reference to terms used herein.

TABLE 1

| | |
|---|---|
| User | The term 'user' is used herein to refer to both a computing device (e.g., element 1 of FIG. 1) such as a client computer, a smartphone device and the like, that may be communicatively connected (e.g., via a computer network) to an authenticating system, and to a human user, that may be requesting or requiring access to an authenticating system via such a computing device. |
| Authenticating system | The term "Authenticating system" is used herein to refer to a computational system that may be configured to authenticate an identity of a user, so as to grant access to that user to computational resources or stored data. Examples for such authenticating systems may include a server associated with a bank, a server associated with an online stock trading application, and the like. |
| Authentication factor and identity criterion | The term "Authentication factor" is used herein to refer to an aspect of authentication, that may relate to one criterion of the user's identity (hereinafter an identity criterion). For example, an identity criterion may relate to something that the user 'is', 'knows' or 'has', and the authentication factor may respectively relate to fingerprint-based authentication, password-based authentication, and authentication via a property (e.g., a MAC address) of a specific computational device that the user possesses. An authentication factor may include a specific method of authentication, such as a password, answering a question, passing along a code sent to a user device such as a cellular telephone associated with the user, or providing biometric information. An authentication factor typically focusses on one or more specific identity criterion. |
| Authentication scheme | The term "authentication scheme" is used herein to refer to a combination of one or more authenticating factors, that may be optimally selected by embodiments of the present invention, as elaborated herein. Authentication may be the process of ensuring or determining, or determining the likelihood that, a person is who the person presents themselves to be. Authentication may also include determining whether or not a person is the or a person associated with an account. Authentication may include accepting a user's identification (e.g. by a user explicitly entering a name or identification, a user providing a bank account or other account, or another method), and then determining if that user actually corresponds to that identification. |
| Authentication level and a-priori score | The term "a-priori score" is used herein to refer to a property of a specific authentication factor, that may represent a level of confidence of the authenticating system in that factor. For example, a password-based authentication factor (e.g. that may commonly be hacked) may be regarded by the authenticating system as having a level of authentication that is lower than a voice-recognition based authentication factor. In some embodiments, the authenticating system may require a minimum authentication level for successful authentication, that may be obtained by aggregating one or more authentication factors, according to the authentication factors cumulative a-priori score. |
| Authentication success probability | The term "authentication success probability" is used herein to refer to the probability of a first-time success of a specific authentication factor. For example a user may enter their password correctly 9 out of 10 times. The authenticating system may report the success of 9 attempts and failure of one, and an embodiment may accordingly calculate the success probability to be 90%. A successful authentication may occur for example when a user identifies themselves as a certain person or identifies themselves as associated with a certain account, and a system determines that it is correct that the person is identified as that person or is associated with the account. For example, successful authentication may occur when the person is who they say they are. |
| Risk score | The term "risk score" is used herein to refer to a score that may be calculated by embodiments of the invention and attributed to a specific authentication factor and/or authentication scheme, to represent a probability of successful fraudulent authentication using that authentication factor and/or scheme. |
| Convenience score | The term "convenience score" is used herein to refer to a score that may be calculated by embodiments of the invention and attributed to a specific authentication factor and/or authentication scheme, to represent at least one element relating to ease of use of that authentication factor or scheme. For example, the authentication convenience score may include a duration of the authentication process, complexity of an authentication scheme (e.g., a number of authentication factors included in an authentication scheme), a preference (implicit or explicit) of a user for a specific authentication factor, and the like. |

Figure 2:
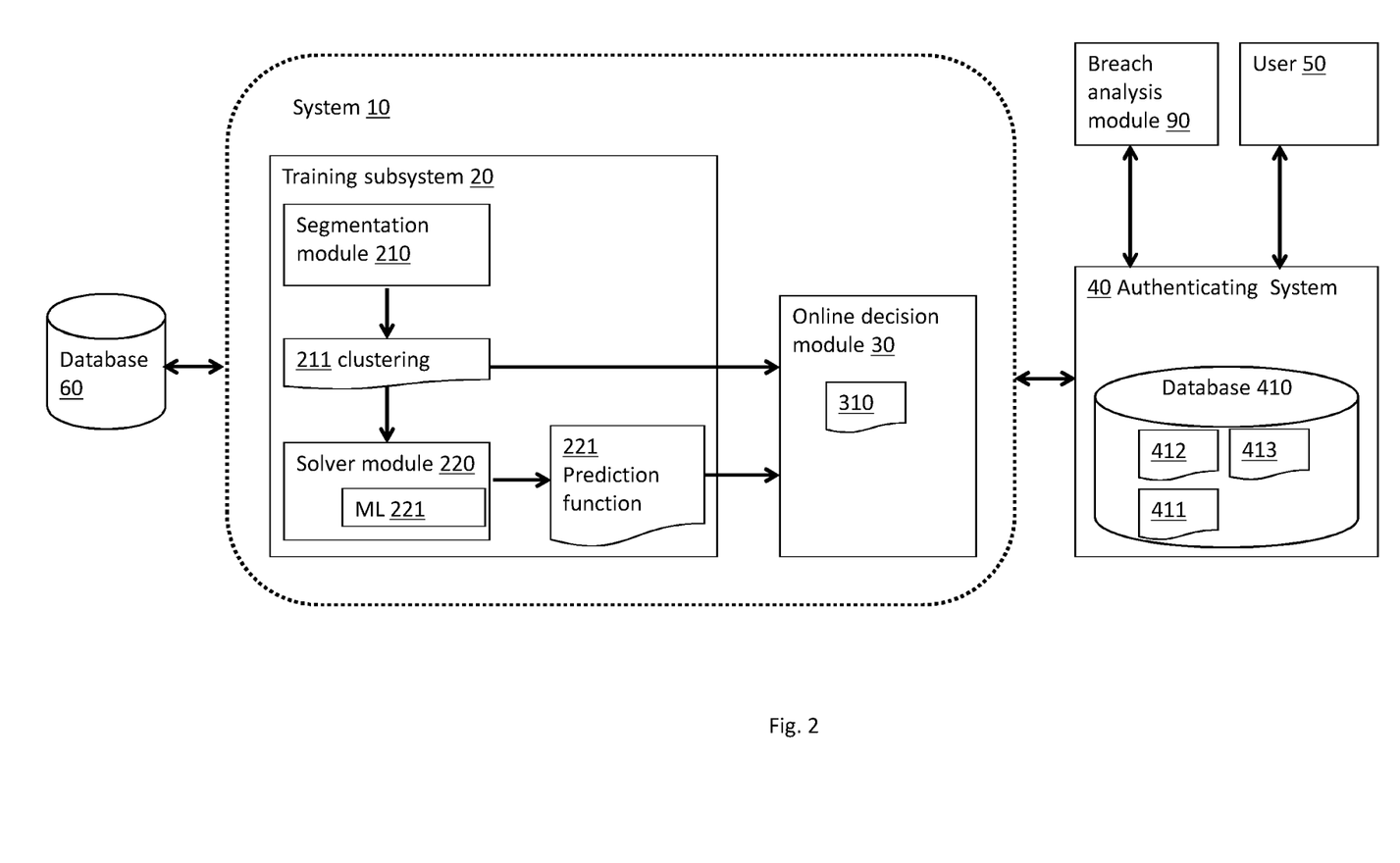
FIG. 2 is a block diagram, depicting a system for adaptively determining an optimal authentication scheme, according to some embodiments.

Reference is now made to FIG. 2, which is a block diagram, depicting a system 10 for adaptively determining an optimal authentication scheme, according to some embodiments.

System 10 may be or may include at least one computing device (e.g., element 1 of FIG. 1), configured to implement at least one method of adaptively determining an optimal authentication scheme, as elaborated herein.

Authenticating system 40 may be or may include at least one computing device (e.g., element 1 of FIG. 1), and user 50 may request or require from authenticating system 40 access to a computational resource thereof or data stored therein. For example, authenticating system 40 may be an online banking server, and user 50 may be an online client computer, used by a human user, requesting access to a bank account.

Computing device 1 of authenticating system 40 may be configured to execute a set of instruction codes, whereupon execution of the set of instruction codes authenticating system 40 may receive an identification (e g a name, a bank account number, and the like) of user 50, and may authenticate the identity of user 50 to grant the required access. For example, authenticating system 40 may perform at least one authentication procedure that may include:

reception of authenticating data from the user (e.g., a password, biometric data, etc.);

comparison of the received data with previously stored data (e.g., a previously stored password, stored on a database such as element 410); and verification or authentication of user 50 identity according to the comparison, as known in the art.

Access may include the ability to interact with the system, the ability to purchase items from the system, the ability to transfer money to or from the system, or other actions. For example, authenticating system 40 may be a server associated with a banking system, and user 50 may require access to data including details of a bank account. Authenticating system 40 may include on-line merchants, credit card companies, data storage systems, corporations providing data access to employees, or other systems.

As known in the art, authenticating system 40 may receive an identity or identification (e.g., a user name, a user ID number, a bank or other account number and the like), or a "represented" or "provided" identity (who the user purports to be, or the account the user purports to have access to) and may require authentication of the identity of user 50 to grant the required access. Identity when used herein may include the identification of an account or entity associated with a user. E.g. identity may include a financial account number which the user has authorization to access. An authentication process may include the use of one or more authentication factors. Each factor may relate to at least one identity criterion, commonly referred to as 'is', 'has' or 'knows' identity criteria.

For example, an identity criterion may be something that the user 'is' (e.g., a human, having a specific face, voice, fingerprint, etc.) and the authentication factor may be a biometric authentication of at least one biological element (e.g., face, voice and fingerprint recognition respectively).

In another example, an identity criterion may be something that the user 'has' (e.g., a specific computing device, such as a cellular phone having a specific International Mobile Equipment Identity (IMEI) identification number, or a client computer, having a specific Media Access Control (MAC) address). The authentication factor may be an association of the user to a previously certified, stored identification number (e.g., previously registered MAC or IMEI).

In yet another example, the identity criterion may be something that the user 'knows' (e.g., a password, an answer to a predefined question, etc.) and the authentication factor may include verification of the user vis a vis such previously stored data.

In some embodiments, authenticating system 40 may store in database 410 a scoring table 412 of supported or available authentication factors (e.g., password authentication, MAC address authentication and face recognition). Table 2 below provides an example of a scoring table 412 as may be included in a system for adaptively determining an optimal authentication scheme according to some embodiments.

TABLE 2

| Identity criterion | Authentication factor | A-priori score |
|---|---|---|
| 'Knows' | Password | Score 1 |
| 'Knows' | Predefined question 1 | Score 2 |
| 'Knows' | Predefined question 2 | Score 3 |
| 'Has' | Computer MAC | Score 4 |
| 'Has' | Email account | Score 5 |
| 'Has' | Cellular IMEI | Score 6 |
| 'Is' | $1^{st}$ Fingerprint | Score 7 |
| 'Is' | $2^{nd}$ Fingerprint | Score 8 |
| 'Is' | Voice recognition | Score 9 |
| 'Is' | Face recognition | Score 10 |

As shown in table 2, authenticating system 40 may attribute in scoring table 412 an a-priori score to each supported or available authentication factor. For example, authenticating system 40 (e.g. an online broker service) may support all or some authentication factors as elaborated on table 2 above. Authenticating system 40 may attribute in table 412 a low score to 'knows' identity criteria (e.g., under the assumption that passwords are frequently hacked), a medium score for 'has' identity criteria (e.g., under the assumption that identification numbers are not as easy to access), and a high score for 'is' identity criteria (e.g., under the assumption that biometric data may be difficult to counterfeit).

Authenticating system 40 (e.g., an online banking server) may include a policy 411 that may be specific to or unique to (e.g., as part of a predefined policy determined by the bank) to the specific authenticating system 40. Policy 411 may be stored (e.g., as a data object on database 410), and may dictate various characteristics of authenticating system's 40 authentication process.

In some embodiments, policy 411 may include a minimal required level of authentication. The minimal required level of authentication may, in turn, dictate one or more possible authentication schemes.

For example, a minimal required level of authentication (e.g. a numeral value 'N') may be satisfied by authentication schemes that may include a combination of authentication factors, of which the cumulative sum of scores equals or exceeds the minimal required level of authentication (e.g., >=N).

In another example, policy 411 of the authenticating system 40 may require diversification of the identity criteria. Consequently, a minimal required level of authentication (N) may be satisfied by authentication schemes that include a combination of authentication factors of different identity criteria and of which the cumulative sum of scores equals or exceeds the minimal required level of authentication (e.g., >=N).

According to some embodiments, system 10 may receive from authenticating system 40 at least one element (e.g. a required level of authentication) of policy 411 of authenticating system 40 and an identity of a user requiring access to the authenticating system. System 10 may consequently produce a list or set of optimally selected authentication schemes 310 according to the authenticating system policy 411 and according to historical information, as explained herein. The possible authentication schemes may be stored by authenticating system 40 as a table 413 on database 410, and/or presented by authenticating system 40 to user 50 as part of the authentication process.

Pertaining to the same example, policy 411 may dictate a minimal required authentication level, which in turn may dictate three possible authentication schemes:

- a first scheme may include three 'knows' authentication factors. For example, user 50 may be required to provide a password, a name of a pet and a name of a relative, to accumulate the score of the three authentication factors and obtain the required level of authentication.
- a second scheme may include two authentication factors, such as a 'knows' factor and a 'has' factor. For example, user 50 may be required to provide a password, from a preregistered device (e.g., having a previously verified MAC address), to accumulate the score of the two authentication factors and obtain the required level of authentication.
- a third scheme may include a single 'is' authentication factor. For example, user 50 may be required to present their fingerprint to obtain the required level of authentication. Table 3 below depicts an embodiment of table 413 according to this example.

TABLE 3

(Example of a possible schemes table 413).

| Scheme ID | Identity criterion | Authentication factor |
|---|---|---|
| Scheme #1 | 'Know' | Password |
|  |  | Name of a pet |
|  |  | Name of a relative |
| Scheme #2 | 'Know' | Password |
|  | 'Has' | MAC address |
| Scheme #3 | 'Is' | Fingerprint |

According to some embodiments, policy 411 may include at least one of: a minimal required authentication level and at least one available authentication factor associated with an a-priori score. The term 'available' is used herein to refer to an authentication factor (e.g., fingerprint-based authentication) that may be supported by the authenticating system 40 (e.g., one that is associated with a fingerprint reader).

System 10 may receive policy 411 or at least one element thereof, from authenticating system 40 and may produce a list or set including at least one suggestion of an authenticating scheme (e.g. as depicted in Table 3) with respective one or more authentication factors, the combination of which may satisfy the authenticating system's 40 policy 411 requirements (e.g. minimal authentication level requirement, diversification, requirement etc.).

According to some embodiments, system 10 may store (e.g. on database 60) data including historical information regarding previous authentication attempts by user 50. Such historical data may include, for example, the number of successful and failed previous authentication attempts by user 50 per each authentication factor.

For example, a first user 50 may attempt to authenticate their identity by a first authentication factor (e.g., a voice-recognition based authentication) and may fail (be rejected by authenticating system 40), and a second user 50 may attempt to authenticate oneself by an authentication scheme including one or more second authentication factors (e.g., password and MAC address) and may succeed. System 10 may store on database 60 historical data including the success or failure of each such authentication attempt in relation to specific users 50 identification (e.g. a username, an email account etc.). The historical data may be available for reading by system 10 during future authentication attempts by the same specific users 50.

In some embodiments, a user 50 may attempt to authenticate their identity vis a vis authenticating system 40 and system 10 may calculate, per each available authentication scheme and/or factor, the user's probability of successful authentication (e.g. a condition in which system 10 correctly authenticates an identity of user 50) based on the historical information. For example, a processor (e.g., element 2 of FIG. 1) may read data relating to previous voice-recognition based authentication attempts of user 50 and calculate the percentage of first-time successful authentication attempts of that authentication factor as the respective success probability.

According to some embodiments, system 10 may be associated with or may include a breach analysis module 90, configured to determine (e.g., by a human supervisor and/or by a machine learning (ML) model) successful fraudulent attempts to authenticate a user's identity and/or failed unauthorized authentication attempts vis a vis authenticating system 40.

System 10 may obtain (e.g., from breach analysis module 90) and store (e.g., in database 60) data including risk-related information, associated with historical authentication attempts. Such risk-related information may include for example, a number of verified cases of successful fraudulent authentication attempts per user and per authentication factor and a number of verified cases of failed unauthorized authentication attempts per authentication factor.

System 10 may calculate and attribute a risk score to at least one authentication factor and/or authentication scheme according to the stored data. For example, system 10 may calculate a percentage of successful fraudulent attempts of a specific authentication factor (e.g., password-based authentication) from an overall number of authentication attempts using that authentication factor. The risk score may be a function of the calculated percentage (e.g. the percentage of authentication attempts by the specific authentication factor that do not include successful fraudulent attempts and verified failed unauthorized authentication) and may represent the probability that the specific authentication factor may be safely used (e.g., not succumb to a fraudulent authentication attempt).

In another example, the risk score may be calculated according to the Sørense-Dice index equation below:

$$\text{Risk Score} = \frac{2TP}{2TP + FP + FN}$$

where:
- TP is the number of True Positive authentications (e.g., the number of successful authentication attempts by genuine, non-fraudulent users);
- FP is the number of False Positive authentications (e.g., the number of successful but fraudulent authentication attempts); and
- FN is the number of False Negative authentications (e.g., the number of failed authentication attempts by genuine, non-fraudulent users).

According to some embodiments, system 10 may store (e.g., in database 60) data associated with the convenience of one or more authentication factors. For example, system 10 may store the duration of one or more authentication attempts (e.g., how long it takes to authenticate the identity of user 50 according to a specific authentication factor), calculate a convenience score (e.g., an average of duration of each authentication attempt) and attribute or assign the convenience score to at least one authentication factor.

According to some embodiments, system 10 may further store (e.g., in database 60) data associated with a preference of one or more users 50 for one or more specific authentication factors. The user preference may be obtained explicitly (e.g., by direct input from a user 50) or implicitly (as elaborated further below). The user preference may be added as a factor in the convenience score. For example, when specific user 50 or specific group of users 50 attempt to authenticate their identity vis a vis authenticating system 40, an authentication factor corresponding with the user(s) preference may be attributed a high convenience score.

According to some embodiments, system 10 may be configured to optimally select one or more authentication schemes, each including one or more authentication factors, according to the predefined policy 411 associated with an authenticating system 40. For example, authenticating system 40 may be an online banking server, and the respective bank may dictate a policy for selecting an optimal authentication scheme.

According to some embodiments, policy 411 may include at least one of:
- a minimal number of authentication factors;
- at least one required type of authentication factors (e.g., authentication by password and authentication by answering a predefined question);
- at least one required identity criterion (e.g., authentication by 'knows', 'is' and 'has' criteria);
- a minimal success probability score per each authentication factor; and
- a minimal overall success probability score for the authentication scheme.

For example, a policy may dictate that an authentication scheme must:
- include at least 2 authentication factors, each relating to a different type, such as face recognition and speech-recognition based authentication factors;
- face recognition must have a success probability of at least 99.995%;
- speech-recognition must have a success probability of at least 98%; and
- the overall success probability must be at least $1-(10^{-4})$.

Policy 411 may further include one or more attribute weights (e.g., a success probability attribute weight, a convenience attribute weight, a preference attribute weight and a risk attribute weight), associated with respective attributes (e.g., success probability, convenience score, explicit and/or implicit user preference and a risk score) of different authentication factors. In some embodiment, policy 411 may further include a preference attribute weight, to include the user's preference in the selection of authentication factors, as explained herein.

Pertaining to the same example of the bank, the banks policy 411 may dictate a first degree of importance to security (e.g., by assigning a first attribute weight to the risk score), a second degree of importance to success rate (e.g., by assigning a second attribute weight to the success probability) and a third degree of importance to convenience (e.g., by assigning a third attribute weight to the convenience score).

System 10 may produce a set or list 310 including an optimal selection of one or more authentication schemes, each including one or more authentication factors, according to the historical information and policy 411 (e.g., the required authentication level, the a-priori scores and the one or more attribute weights).

The selection of schemes is herein referred to as optimal in a sense that system 10 may select or recommend authentication schemes in a manner that optimizes (e.g., provides the highest values of at least one of: the success probability, risk score and convenience score) in relation to the respective one or more attribute weights of the dictated policy.

In some embodiments, system 10 may select at least one optimal authentication scheme according to a cumulative sum of scores, weighted by the attribute weights.

Pertaining to the same example of the bank policy 411, the first attribute weight (e.g., assigned to the risk score) may be higher than the third attribute weight (e.g., assigned to the convenience score). This configuration may require additional authentication procedures to be performed (e.g., authentication schemes including a large number of authentication factors), at the expense of user's 50 convenience. However, as the number of authentication procedures increases, the convenience score may decrease accordingly, and may affect the cumulative sum (according to the respective weights limit system 10) and prevent system 10 from further increasing the number of authentication factors. Hence, policy 411 may configure system 10 to balance or mitigate between different authentication requirements (e.g., between a user's preference and the authenticating system's security requirements).

Authenticating system 40 (e.g., an online banking server) may display (e.g., over a web browser) the content of list or set 310 as a selection list to a user 50 and may prompt user 50 to select one scheme according to their preference. Authenticating system 40 may propagate the user's 50 selection to system 10 as feedback, to be further analyzed, as described herein.

For example, user 50 may be presented with a first scheme including a first authentication factor (e.g., password) and second scheme including a second authentication factor (e.g., voice recognition). In a first scenario, user 50 may have forgotten the password and may own a smartphone, enabling them to record their voice, and may thus prefer the voice recognition scheme. In a second scenario, user 50 may not own a smartphone and may thus prefer the password scheme. System 10 may use this information, in order to:
- fine tune the selection of future schemes per specific user 50; and
- fine tune the selection of future schemes per users that are similar (e.g., have a similar profile) to that of user 50, as elaborated herein.

System 10 may select at least one authentication scheme, including one or more authentication factors according to data pertaining to historical information and the authenticating system's policy. For example, such data may include at least one of:
- the calculated authentication success probability in relation to the respective attribute weight;
- the calculated convenience score, in relation to the respective attribute weight;
- the calculated risk score, in relation to the respective attribute weight;
- the explicit and/or implicit preference score (as elaborated below), in relation to the respective preference attribute rate; and
- the cumulative a-priori score in view minimal required authentication level.

In some embodiments, the selection list of one or more optimal authentication schemes 310 may include one authentication scheme according to the data elaborated above. For example, system 10 may select an optimal scheme that may provide a maximal cumulative score according to the above data (e.g., a maximal weighted sum of a preference score, a risk score, a convenience score, etc.).

Additionally, or alternately, list 310 may include a plurality of optimal authentication schemes, selected or ordered according to their scores (e.g., the maximal weighted sum of scores, the second weighted sum, etc.).

In yet another embodiment, list 310 may include at least one probabilistically selected (e.g., randomly selected) scheme. Such probabilistic selection may serve to enable system 10 to diversify the feedback from a user 50 (e.g., the user's selection of one authentication scheme of list or set 310), and avoid a condition in which the function of optimal scheme selection by system 10 may be drawn toward a local solution, rather than a global solution, as known in the art.

System 10 may send the selection list of one or more authentication schemes 310 to authenticating system 40. Authenticating system 40 may in turn present the list 310 of one or more authentication schemes to user 50 and prompt user 50 to explicitly select one or more authentication scheme of the list 310 according to their preferences.

According to some embodiments, system 10 may be configured to store (e.g. on database 60) the user's 50 selection as an explicit preference or selection of an authentication scheme and/or authentication factor to use this information in future authentication attempts, and to include an aspect of preference of user 50 and/or similar users in the selection of optimal authentication schemes.

For example, authentication system 40 (e.g., an online banking server) may present (e.g., via a web browser) a first authentication scheme, including at least one first authentication factor (e.g., two knows' authentication factors, such as authentication by password and authentication by answering a predefined question) and a second authentication scheme, including at least one second authentication factor (e.g., a single 'is' authentication factor, such as face recognition). Authentication system 40 may prompt user 50 to select (e.g., as a selection dialog box on the web browser screen, as known in the art) between the presented schemes, and record or store (e.g. on database 410) the selection of user 50. Authentication system 40 may propagate the selection of user 50 to system 10, which may in turn count and store (e.g. on database 60) the number of times each authentication factor has been selected to identify the explicit preferences of user 50.

According to some embodiments, system 10 may assign an explicit preference score to each authentication factor according to the frequentness of selection thereof. System 10 may subsequently produce list 310 (of optimal selection of authentication schemes and/or authentication factors), according to the historical information (e.g. accumulated preference scoring) and policy 411 (e.g., the required authentication level and the preference attribute weight).

According some embodiments, system 10 may include a training subsystem 20, configured to continuously obtain from one or more authenticating systems 40 data associated with users 50 and respective authentication attempts, and adaptively recommend one or more authentication schemes according to the obtained data, as elaborated herein.

According to some embodiments, system 10 may obtain or receive from one or more authenticating systems 40 data pertaining to parameters of personal profile information of a plurality of users 50, and store the profile data (e.g., on database 60). The data may be obtained, for example during user's 50 access to authenticating system 40, or from a database associated with authenticating system 40. For example, at least one authenticating system 40 may be an online banking server, associated with a database of a bank that may store personal information pertaining to profile parameters of the user. Such parameters may include, for example: the user's age, gender, income, address of residence, marital condition, possession of a bank account, linkage to other bank accounts, possession of a computing device (e.g., a smartphone), possession of an email account, and the like.

Training subsystem 20 may include a segmentation module 210, configured to continuously read or receive the personal profile parameters' data of the plurality of users and segment or group the plurality of users 50 to clusters in a clustering model according to the received personal profile information. Such clustering may be implemented by any suitable, supervised or unsupervised clustering model.

For example, segmentation module 210 may be or may include a non-supervised K-means clustering model, configured to cluster the plurality of users according to an optimal number of K clusters, around a respective number K of centroid vectors. Each centroid vector of the clustering model may be characterized by specific cluster parameter values, that may or may not be equivalent to the personal profile parameters, as known in the art.

A user 50 may require authentication by authenticating system 40 and may provide personal profile parameters for that purpose. System 10 may then attribute a membership of one of the clusters to the user and may produce a list 310 (e.g. an optimal selection of one or more authentication schemes) according to the individual user's membership in the cluster, as explained herein.

According to some embodiments, segmentation module 210 may be configured to obtain or determine at least one implicit preference of an authentication factor of at least one user, according to a membership of the user in a cluster.

For example, segmentation module 210 may receive personal profile parameters (e.g. ownership of a smartphone) pertaining to a user 50 for whom the preference of authentication factor is unknown (e.g., in a condition in which this is the user's first authentication attempt). Segmentation module 210 may associate or assign a membership of user 50 to a cluster of users according to their personal profile parameters (e g, similar users, who also possess smartphones). Segmentation module 210 may determine at least one implicit preference associated with the membership cluster (e.g., that users possessing a smartphone may prefer authentication be fingerprint recognition to authentication via sending a password) and attribute the implicit preference to the new user.

According to some embodiments, system 10 may assign an implicit preference score according to the implicit selection of at least one authentication factor. System 10 may update the list or set of at least one authentication scheme 310 according to the implicit preference score, so as to present to a user at least one authentication factor according to explicit selections and preferences of similar users (e.g., of the same cluster).

According to some embodiments, segmentation module 210 may update the probability of a user's successful authentication per each authentication factor according to the user's cluster membership. Pertaining to the same example, segmentation module 210 may induce a probability of a user's successful authentication via a fingerprint authentication method according to an average probability of success of other users in the membership cluster. In a similar manner, system 10 may update the list or set of at least one authentication scheme 310 according to the updated probability of a user's successful authentication.

Training subsystem 20 may include a solver module 220, configured to predict the likelihood of a user to prefer and succeed at a first attempt of an authentication process, using a specific authentication factor.

Solver module 220 may be or may include a supervised machine-learning (ML) model 221, configured to receive clustering data 211 of segmentation module 210 and stored data pertaining to historical authentication attempts.

For example, when segmentation module 210 is implemented as a K-means clustering model, solver module 220 may receive as clustering data 211 the respective K centroid vectors from segmentation module 210.

The stored data pertaining to historical authentication attempts may include at least one of:
- a risk score associated with a specific authentication factor;
- a success probability associated with the authentication factor;
- a convenience score associated with a specific authentication factor; and
- an explicit and/or implicit selection score of authentication factors and/or schemes.

Solver module 220 may be adapted to produce a prediction function 221, adapted to predict an optimal authentication factor and/or authentication scheme according to the clustering data and the gathered historical authentication data.

In other words, solver module 220 may calculate a function, associating profile parameters of at least one cluster of users with stored historic data pertaining to previous authentication attempts.

For example, solver module 220 may produce a plurality of authentication schemes (e.g. a vector 'S' of authentication schemes, each including a combination or permutation of authentication factors) where each authentication scheme (Si) is a unique combination of available authentication factors. (The term unique is used herein to refer to a condition in which for each index m and index n, where ((m,n)=0, 1, 2 . . . ) and m!=n, there is $S_m!=S_n$).

Solver module 220 may produce a likelihood Matrix [Y], wherein each entry $Y_{i,j}$ represents a likelihood that a user of cluster j would prefer authentication scheme $S_i$ and that the user would succeed on a first authentication attempt.

For example, the likelihood that a user of cluster j would prefer authentication scheme Si and that the user would succeed on a first authentication attempt may be calculated according to at least one of: the explicit preference score, an implicit preference score (as elaborated elsewhere), the probability of success, the convenience score and the risk score. For example, each of the aforementioned scores (e.g. the risk score) may be represented as a fractional number between 0 and 1 (e.g. a probability that authentication would not succumb to fraudulent access), and the likelihood may be calculated as the product of multiplication of the aforementioned scores.

Machine learning model 221 may be trained, as known in the art to predict the likelihood values $Y_{i,j}$ given specific cluster j parameters and authentication scheme $S_i$.

For example, ML 221 may receive as feedback at least one of:
- an input via a user interface (e.g., via input element 7 of FIG. 1) from an administrative user (e.g. a user distinct from user 50 for whom authenticating system performs the authentication process), including for example: an outcome of an authentication process, a change in authentication system's 40 policy, a change in available authentication factors, and the like;
- an input from authenticating system 40, regarding the user's 50 selection of at least one authentication factor;
- an input from authenticating system 40, regarding the success or failure of the selected authentication factor(s); and
- at least one input from breach analysis module 90 regarding the outcome of the authentication (e.g., whether the access was fraudulent), and train ML model 221 according to the feedback to predict, or calculate a dependency of at least one value of an entry $Y_{i,j}$ of likelihood Matrix [Y] given a vector cluster parameters associated with a specific cluster of clustering model 211.

As known in the art of machine learning, a plurality of algorithms may be applied to calculate, or train ML model 221 to predict such dependency based on the provided historical data. For example, solver module 220 may implement a gradient descent algorithm for this purpose.

According to some embodiments, system 10 may receive from authenticating system 40 personal profile information of a user (e.g., in real time, or in near-real time, during the user's 50 authentication process). Segmentation module 210 may attribute or assign a membership in one cluster of the clustering model 211 to the user according to their personal profile information. Solver module may predict the values of at least one entry $Y_{i,j}$ of likelihood Matrix [Y] according to the membership cluster's parameter values and according to the training of the ML model 221.

According to some embodiments, system 10 may include a decision module, configured to receive the at least one entry $Y_{i,j}$ of likelihood Matrix [Y], and determine at least one optimal authentication factor for use by user 50, according to the at least one entry $Y_{i,j}$ of likelihood Matrix [Y] (e.g. given the user's membership of a specific cluster and stored data of historical authentication attempts).

Figure 3:
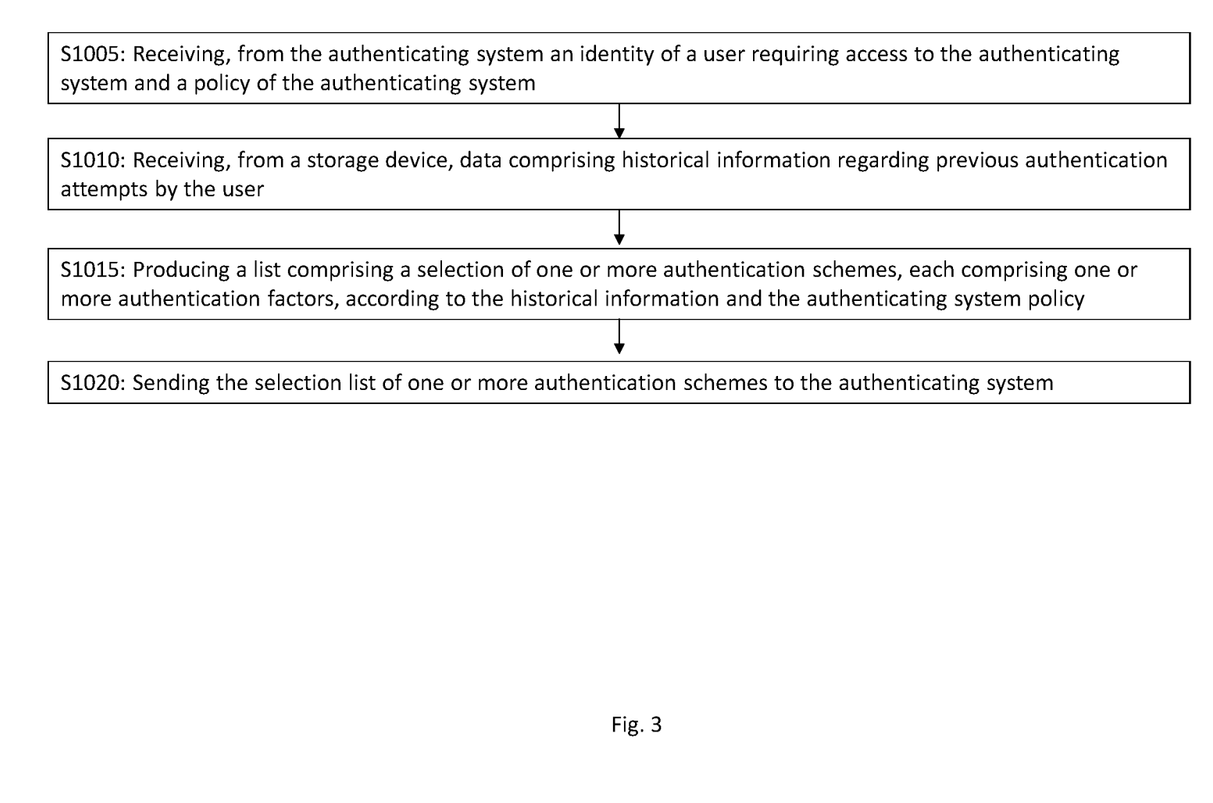
FIG. 3 is a flow diagram, depicting a method of adaptively determining an optimal authentication scheme, according to some embodiments.

Reference is now made to FIG. 3, which is a flow diagram, depicting a method of adaptively determining an optimal authentication scheme (e.g. element 40 of FIG. 2) by at least one processor (e.g. element 2 of FIG. 1), according to some embodiments.

As shown in step S1005, the processor may be configured to receive, from the authenticating system an identity of a user (e.g., an ID number, a name, an email account and the like) requiring access to the authenticating system (e.g., an online database server) and a policy of the authenticating system (e.g., a minimal authentication level, at least one available authentication factor, at least one attribute weight, at least one a-priori score and the like).

As shown in step S1010, the processor may receive, from a storage device, data including historical information regarding previous authentication attempts by the user, including for example a number of successful authentication attempts, a number of verified fraudulent authentication attempts, duration of previous authentication attempts and the like.

As shown in step S1015, the processor may produce a list or a set including an optimal selection of one or more authentication schemes, each including one or more authentication factors, according to the historical information and the authenticating system policy. As elaborated herein, the selection of one or more authentication schemes may take into account at least one of: a user's explicit and/or implicit selection or preference of at least one authentication factor, at least one element of the authenticating system's policy, and statistical historical data relating to previous authentication attempts, including: a risk associated with at least one authentication factor, a convenience of using at least one authentication scheme (e.g. duration of authentication and number of authentication factors within the authentication scheme), and the like.

As shown in step S1020, the processor may send the selection list (e.g., element 310 of FIG. 2) of one or more authentication schemes to the authenticating system 40, that may, in turn prompt the user to select an authentication scheme according to their preference. The processor may store the user's selection for further analysis, to iteratively fine-tune the prediction and/or determination of an optimal authentication scheme by the processor.

As known in the art, commercially available systems for authentication of a user's identity may be indifferent to or dissociated from a variety of properties, including properties of the user and the authenticating system, and from the history of previous authentication attempts. Embodiments of the present invention may improve such technology by providing a method of authentication that may be:

adapted to suit a policy that may be dictated by one or more authenticating systems, and may dynamically change over time;

adapted to suit a user's explicit and/or implicit preference of authentication method;

safest (e.g., having a minimal probability of fraudulent access among a plurality of authentication methods); and most convenient (e.g., consuming a minimal duration among available authentication methods).

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A method of determining an optimal authentication scheme for an authenticating system by at least one processor, the method comprising:

receiving, from the authenticating system: (a) an identity of a user requiring access to the authenticating system, (b) one or more available authentication factors and (c) one or more attribute weights;

producing a plurality (S) of authentication schemes, wherein each authentication scheme (Si) comprises a unique combination of a plurality of authentication factors;

for one or more authentication schemes Si, using a machine learning (ML) model to predict a likelihood that (a) the user would prefer authentication scheme Si, and (b) that the user would succeed on a first authentication attempt;

producing a list, comprising an optimal selection of one or more authentication schemes Si, according to the predicted likelihood, wherein said list is optimized according to the one or more attribute weights;

sending the selection list to the authenticating system; and presenting the selection list, by the authenticating system, to the user, as part of an authentication process, to authenticate the identity of the user by the authenticating system.

2. The method of claim 1, further comprising:

prompting the user to select at least one authentication scheme; and storing the user's selection as an explicit preference of authentication.

3. The method of claim 2, further comprising receiving from the the authenticating system a required authentication level and an a-priori score representing a level of confidence of the authenticating system in each authentication factor, and wherein producing a list comprising a selection of one or more schemes is further done according to the a-priori score and required authentication level.

4. The method of claim 1, wherein the one or more attribute weights are selected from a list comprising a success probability attribute weight, a convenience attribute weight, a risk attribute weight and a preference attribute weight.

5. The method of claim 3 further comprising receiving, from a storage device, data comprising information regarding previous authentication attempts by the user, selected from a list consisting of: a number of successful previous authentication attempts by the user per each authentication factor, a number of failed previous authentication attempts by the user per each authentication factor, duration of authentication processes, verified cases of successful fraudulent access, verified cases of failed unauthorized access attempts, and explicit selection of an authentication factor by the user.

6. The method according to claim 5, further comprising:

receiving data relating to personal profile information of a plurality of users; and grouping the plurality of users to clusters in a clustering model according to the received personal profile information, wherein each cluster is characterized by specific cluster parameter values.

7. The method according to claim 6 comprising:

producing a likelihood matrix Y, wherein each entry $Y_{i,j}$ represents a likelihood that a user of cluster j would prefer authentication scheme $S_i$ and that the user would succeed on a first authentication attempt; and training a machine learning (ML) model, based on the information regarding previous authentication attempts, to predict $Y_{i,j}$ given specific cluster j parameters.

8. The method according to claim 7 wherein the likelihood that a user of cluster j would prefer authentication scheme $S_i$ and that the user would succeed on a first authentication attempt is calculated according to at least one of:

an explicit preference score;
a probability of success;
a convenience score; and
a risk score.

9. The method according to claim 7, wherein using an ML model to predict a likelihood further comprises:

receiving personal profile information of a user;

attributing a membership in one cluster of the clustering model to the user according to their personal profile information;

predicting likelihood Matrix Y according to the membership cluster's parameter values and according to the training of the ML model;

determining an optimal entry $Y_{i,j}$ for the user;

selecting at least one optimal authentication scheme according to the determined optimal entry $Y_{i,j}$; and producing a list comprising the optimal at least one selected authentication scheme.

10. The method according to claim 9 comprising: obtaining at least one implicit preference of an authentication factor of at least one user, according to a membership of the user in a cluster.

11. The method according to claim 10, comprising updating the probability of a user's successful authentication per each authentication factor according to the user's cluster membership.

12. The method according to claim 11, comprising updating the list of one or more recommended authentication schemes according to at least one of: the updated probability of a user's successful authentication and the obtained at least one implicit preference.

13. A system for determining an optimal authentication scheme for an authenticating system, the system comprising: a non-transitory memory device, wherein modules of instruction code are stored, and a processor associated with the memory device, and configured to execute the modules of instruction code, whereupon execution of said modules of instruction code, the processor is further configured to:
receive, from the authenticating system: (a) an identity of a user requiring access to the authenticating system, (b) one or more available authentication factors and (c) one or more attribute weights;
produce a plurality (S) of authentication schemes, wherein each authentication scheme (Si) comprises a unique combination of a plurality of authentication factors;
for one or more authentication schemes Si, use a machine learning (ML) model to predict a likelihood that (a) the user would prefer authentication scheme Si, and (b) that the user would succeed on a first authentication attempt;
produce a list comprising an optimal selection of one or more authentication schemes Si, according to the predicted likelihood, wherein said list is optimized according to the one or more attribute weights;
send the selection list to the authenticating system; and
present the selection list, by the authenticating system, to the user, as part of an authentication process, to authenticate the identity of the user by the authenticating system.

14. The system of claim 13, wherein the processor is configured to:
prompt the user to select at least one authentication scheme; and
store the user's selection as an explicit preference of authentication.

15. The system of claim 14, wherein the processor is configured to:
receive from the authenticating system a required authentication level and an a-priori score representing a level of confidence of the authenticating system in each authentication factor;
and produce a list comprising a selection of one or more schemes according to the a-priori score and required authentication level.

16. The system of claim 13, wherein the one attribute weights are selected from a list comprising a success probability attribute weight, a convenience attribute weight, a risk attribute weight and a preference attribute weight.

17. The system of claim 15, wherein the processor is configured to receive, from a storage device, data comprising information regarding previous authentication attempts by the user, selected from a list consisting of: a number of successful previous authentication attempts by the user per each authentication factor, a number of failed previous authentication attempts by the user per each authentication factor, duration of authentication processes, verified cases of successful fraudulent access, verified cases of failed unauthorized access attempts, and explicit selection of an authentication factor by the user.

18. The system according to claim 13, wherein the processor is configured to:
receive data relating to personal profile information of a plurality of users; and
group the plurality of users to clusters in a clustering model according to the received personal profile information, wherein each cluster is characterized by specific cluster parameter values.

19. The system according to claim 18, wherein the processor is configured to:
produce a likelihood matrix Y, wherein each entry $Y_{i,j}$ represents a likelihood that a user of cluster j would prefer authentication scheme $S_i$ and that the user would succeed on a first authentication attempt; and
train an ML model, based on the information regarding previous authentication attempts, to predict $Y_{i,j}$ given specific cluster j parameters.

20. The system according to claim 19 wherein the processor is configured to calculate the likelihood that a user of cluster j would prefer authentication scheme $S_i$ and that the user would succeed on a first authentication attempt according to at least one of:
an explicit preference score;
a probability of success;
a convenience score; and
a risk score.

21. The system according to claim 19, wherein the processor is configured to:
receive personal profile information of a user;
attribute a membership in one cluster of the clustering model to the user according to their personal profile information;
predict likelihood Matrix Y according to the membership cluster's parameter values and according to the training of the ML model;
determine an optimal entry $Y_{i,j}$ for the user;
select at least one optimal authentication scheme according to the determined optimal entry $Y_{i,j}$; and
produce a list comprising the optimal at least one selected authentication scheme.

22. The system according to claim 21, wherein the processor is configured to obtain at least one implicit preference of an authentication factor of at least one user, according to a membership of the user in a cluster.

23. The system according to claim 22, wherein the processor is configured to update the probability of a user's successful authentication per each authentication factor according to the user's cluster membership.

24. The system according to claim 23, wherein the processor is configured to update the list of one or more recommended authentication schemes according to at least one of: the updated probability of a user's successful authentication and the obtained at least one implicit preference.

25. A method of determining, by at least one processor, an optimal authentication scheme for an authenticating system, the method comprising:
receiving, from the authenticating system: (a) an identity of a user requiring access to the authenticating system, and (b) a policy of the authenticating system;
producing a plurality of authentication schemes, each comprising one or more authentication factors, the combination of which satisfies the policy;

receiving, from a storage device, data comprising historical information regarding previous authentication attempts made by the user;

for each authentication scheme, using an ML model to predict a likelihood that the user would succeed on a first authentication attempt;

for each authentication scheme, calculating a cumulative weighted sum of: (a) the user's likelihood of successful authentication, and (b) at least one of: a risk of fraud score, a preference score, and a convenience score; and selecting a list comprising at least one authentication scheme according to the calculated cumulative weighted sum.

26. The method of claim 25, wherein said policy comprises at least one of a success probability attribute weight, a convenience attribute weight, a preference attribute weight and a risk attribute weight, and wherein calculating the cumulative sum is done according to the attribute weights.

* * * * *